US008137500B2

(12) United States Patent
Sauer et al.

(10) Patent No.: US 8,137,500 B2
(45) Date of Patent: Mar. 20, 2012

(54) SPRAYABLE LOW-VISCOSITY RUBBER DAMPING COMPOUNDS

(75) Inventors: Ralf Sauer, St. Leon-Rot (DE); Peter Born, Sandhausen (DE)

(73) Assignee: Henkel KGaA, Duesseldorf (DE)

( * ) Notice: Subject to any disclaimer, the term of this patent is extended or adjusted under 35 U.S.C. 154(b) by 0 days.

(21) Appl. No.: 11/830,956

(22) Filed: Jul. 31, 2007

(65) Prior Publication Data

US 2007/0299193 A1 Dec. 27, 2007

Related U.S. Application Data

(63) Continuation of application No. PCT/EP2005/013728, filed on Dec. 20, 2005.

(30) Foreign Application Priority Data

Jan. 22, 2005 (DE) .......................... 10 2005 003 057

(51) Int. Cl.
| | |
|---|---|
| C04B 37/00 | (2006.01) |
| C09J 5/02 | (2006.01) |
| B05D 3/02 | (2006.01) |
| B60C 1/00 | (2006.01) |
| C08K 3/40 | (2006.01) |
| C08K 3/04 | (2006.01) |

(52) U.S. Cl. .................. 156/325; 156/307.3; 427/385.5; 524/494; 524/495

(58) Field of Classification Search ............... 156/307.3, 156/325; 427/385.5; 524/494, 495
See application file for complete search history.

(56) References Cited

U.S. PATENT DOCUMENTS

| | | | |
|---|---|---|---|
| 5,403,623 A | | 4/1995 | Kosters |
| 5,618,859 A | * | 4/1997 | Maeyama et al. ............. 523/201 |
| 5,691,037 A | * | 11/1997 | McCutcheon et al. ........ 428/172 |
| 5,714,824 A | | 2/1998 | Butschbacher et al. |
| 5,756,555 A | | 5/1998 | Wesch et al. |
| 6,096,791 A | * | 8/2000 | Born et al. ....................... 521/54 |
| 6,197,839 B1 | * | 3/2001 | Genz et al. ..................... 521/130 |
| 6,277,903 B1 | * | 8/2001 | Sophiea et al. ................ 523/428 |
| 6,361,643 B2 | | 3/2002 | Born et al. |
| 6,894,108 B1 | * | 5/2005 | Kasai et al. .................... 524/556 |
| 2003/0054173 A1 | * | 3/2003 | Ruddy .............................. 428/413 |
| 2003/0083424 A1 | | 5/2003 | Duck et al. |
| 2003/0207990 A1 | * | 11/2003 | Morihiro et al. .............. 524/832 |
| 2004/0052951 A1 | * | 3/2004 | Sauer et al. ................. 427/385.5 |
| 2004/0211934 A1 | * | 10/2004 | LeStarge ......................... 252/62 |
| 2005/0189442 A1 | * | 9/2005 | Hussaini et al. ............... 239/556 |

FOREIGN PATENT DOCUMENTS

| | | |
|---|---|---|
| CA | 2 041 134 A1 | 4/1991 |
| CA | 2205953 * | 5/1997 |
| DE | 34 44 863 A1 | 7/1986 |
| DE | 40 13 318 C2 | 10/1992 |
| EP | 0 524 058 B1 | 12/1995 |
| EP | 0 524 058 B2 | 12/1995 |
| EP | 0 358 598 B1 | 4/1997 |
| EP | 0 658 597 B1 | 3/1998 |
| EP | 0 702 708 B1 | 3/1998 |
| EP | 0 766 714 B1 | 3/1999 |
| EP | 0 525 769 B1 | 9/1999 |
| EP | 0 793 697 B1 | 2/2000 |
| JP | 04-036371 A | 2/1992 |
| JP | 06-065423 A | 3/1994 |
| JP | 07-292125 A | 11/1995 |
| JP | 2002 047467 A | 2/2002 |
| WO | WO 91/05819 A1 | 5/1991 |
| WO | WO 93/15333 A2 | 8/1993 |
| WO | WO 96/16136 A1 | 5/1996 |
| WO | WO 99/58597 A1 | 11/1999 |
| WO | WO 02/12025 A1 | 2/2002 |

OTHER PUBLICATIONS

International Search Report for WO 2006/076958 A1 published Jul. 27, 2006.
Determination of dynamic mechanical properties of plastics, Beuth Verlag GmbH, Berlin, DIN EN ISO 6721-1 (Jan. 2003) and DIN EN ISO 6721-3 (Dec. 1996) which together supersedes DIN 53440-1 to DIN 53440-3 Jan. 1984 editions.
Determination of viscosities and flow curves using standard design rotary viscometers with a standard geometry measuring system, Beuth Verlag GmbH, DIN 53019-1 (May 1990), DIN 53019-2 (Feb. 2001) and DIN 53019-3 (Feb. 2007).

* cited by examiner

*Primary Examiner* — Philip Tucker
*Assistant Examiner* — Michael Orlando
(74) *Attorney, Agent, or Firm* — Mary K. Cameron

(57) ABSTRACT

Sprayable low-viscosity rubber damping compounds based on liquid rubbers or elastomers and vulcanization agents, which contain small quantities of structure-reinforcing fiber fillers, are notable for the absence of previously usual solid rubbers and have a very low viscosity in the application state. Acoustic compounds of this kind are sprayable with the aid of fully automatic application systems, and are preferably processed at the basic body stage in vehicle construction.

17 Claims, No Drawings

SPRAYABLE LOW-VISCOSITY RUBBER DAMPING COMPOUNDS

CROSS-REFERENCE TO RELATED APPLICATIONS

This application is a continuation under 35 USC Sections 365(c) and 120 of International Application No. PCT/EP2005/013728, filed 20 Dec. 2005 and published 27 Jul. 2006 as WO 2006/076958, which claims priority from German Application No. 102005003057.2, filed 22 Jan. 2005, each of which is incorporated herein by reference in its entirety.

FIELD OF THE INVENTION

The present invention relates to sprayable low-viscosity compositions based on natural and/or synthetic olefinic elastomers containing olefinic double bonds (rubbers) that have acoustic damping properties in the vulcanized state. The invention furthermore relates to the use of the aforesaid compositions as an acoustic damping one- or two-component adhesive, sealant, or coating compound, and a method for joining metal parts and/or for sealing joints between metal parts, and a method for coating components with said compositions.

DISCUSSION OF THE RELATED ART

Very thin-walled panels are almost exclusively used nowadays in the manufacture of vehicles, machines, and appliances. Mechanically moving parts or operating motors inevitably cause these thin-walled panels to vibrate, and this often occurs within the audibility range of the human ear. These vibrations are propagated in the form of solid-borne sound throughout the vehicle, machine, or appliance, and can be radiated into the air at remote locations as unpleasant sound. To reduce sound radiation and for solid-borne sound damping, these panels are therefore, especially in automobile construction and in the manufacture of household appliances, equipped with sound-damping linings (so-called anti-drumming coatings).

According to a conventional procedure, mixtures of bitumen and fillers having a high specific weight are extruded into sheets, from which the corresponding shaped parts are then stamped or cut. These sheets are then adhesively bonded onto the relevant sheet-metal parts; in some cases they must also be adapted to the shape of the panel by heating. Although these bitumen sheets are still often used because of their low material price, they are very brittle and tend, especially at low temperatures, to split away from the panel. The often-proposed addition of elastomers also results in only a slight improvement, which is insufficient for many uses. In addition, application of the preshaped bitumen parts onto complexly shaped or poorly accessible sheet-metal parts of machines or vehicles, e.g., the inner surfaces of the cavities in motor vehicle doors, is not possible at all. A further disadvantage is the fact that in many cases multiple stamped parts are necessary for a single vehicle or appliance, requiring a large outlay to maintain stocks.

Attempts have therefore been made to eliminate the disadvantages of the bitumen sheets using other polymer systems. For example, filler-containing aqueous polymer dispersions of polyvinyl acetate or ethylene/vinyl acetate copolymers have been developed that can be sprayed onto the sheet-metal parts at the required lining thickness. These systems are, however, disadvantageous for industrial use with large production volumes, since at greater lining thicknesses in particular, the water cannot be removed rapidly enough from the sprayed-on layer. A further disadvantage of these conventional sound-damping methods is that these materials serve only the single purpose of sound damping.

EP-A-358598 or DE-A-3444863 describe plastisol formulations that perform the dual function of an underbody protector (protection from abrasion) and acoustic damping. DE-A-4013318 describes a two-layer underbody protector that performs the functions of underbody protection and absorption of the noise caused by impacting particles (stones, gravel, water, etc.).

EP 0766714 A describes plastisol compositions based on vinyl chloride/vinyl acetate copolymers that have been manufactured using the suspension polymerization method. These plastisol compositions have a low viscosity even with a low polymer/plasticizer ratio, so they can be sprayed in airless fashion and have good gelling properties. The document additionally discloses that coatings based on the aforesaid plastisols exhibit a good noise-damping effect. This document proposes using these plastisols in the underbody region of motor vehicles, including the wheel wells, for solid-borne sound-damping coatings, and for corrosion protection and protection from abrasion.

In similar fashion, EP 702708 A describes sound-damping coatings for panels in the underbody region of motor vehicles, based on plastisols made up of 5 to 60 wt% of at least one powdered styrene copolymer or methyl methacrylate homopolymer or copolymer of methyl methacrylate, 5 to 65 wt% plasticizers, 0 to 40 wt% fillers, 2 to 40 wt% reactive additives, and optionally further additives. According to this document, the plastisol formulations described therein are suitable for the manufacture of abrasion-resistant, single-layer linings, capable of application using a spray method, on panels, in particular in the underbody region of motor vehicles in order to reduce the noise caused by the impact of particles, for corrosion protection, and to achieve an abrasion-resistant coating.

WO 96/16136 describes single-component, hot-curing, reactive compositions based on liquid rubbers having reactive olefinic double bonds as well as optionally added rubbers, and vulcanization systems based on sulfur. In the vulcanized state, these compositions have high acoustic loss factor maxima in the utilization temperature range between approximately +10° C. and +40° C. It is also indicated that these compositions can additionally contain finely particulate thermoplastic polymers. The compositions are intended for use as an acoustic damping adhesive or sealant or as a coating compound. According to the disclosure of this document, the hot-curing, reactive compositions are placed, in the form of an extruded sheet, an extruded strand, or an extruded strip, onto the component to be coated and the parts are joined as applicable and are then heated in order to cure the composition.

WO 91/05819 describes thermoplastic compounds for use as sound-damping and vibration-insulating laminated or sheet elements, in particular for motor vehicles. The thermoplastic compounds are said to contain 0.6 to 50% chlorinated polyethylene, 20 to 95% fillers, and 4 to 60% plasticizers compatible with the chlorinated polyethylene. It is indicated that these thermoplastic compositions can be used as sheet material for sound damping and vibration insulation in motor vehicles, buildings, household appliances, and industrial machines.

EP 525769 A describes curable coating compositions containing an oxyalkylene polymer that comprises a silicon-containing group. The silicon-containing group is said to have hydroxyl groups or hydrolyzable groups bound to the silicon atom, and is said to be crosslinkable to form a siloxane bond. According to this document, coating compositions of this kind yield a good coating film having anticorrosion properties, abrasion resistance, and vibration damping, even when these coatings are cured at low temperatures. These coatings are said to be easy to apply using the spray method.

WO 93/15333 describes a method for damping the vibration of a vibrating solid object at a temperature between −20° C. and 200° C. at a vibration frequency of 1 Hz, by making available a viscoelastic layered arrangement having at least one layer containing a thermally curable epoxy acrylate resin.

WO 99/58597 describes acoustic damping compositions containing acrylate-based plastisols and recyclates from paint polymer wastes that contain uncured resin components and are thus capable of chemical reaction. Compositions of this kind are proposed for the manufacture of coatings of rigid objects that exhibit a tendency to vibrate, such as metallic automobile parts. According to the indications in this document, coatings of this kind suppress mechanical vibrations and reduce the noise caused by impacting particles, such as gravel and water, on the vehicle body. It is also indicated that these coatings reduce airborne sound vibration in cavities.

As part of the effort to reduce the complexity of vehicles, machines, and appliances and thereby to decrease manufacturing costs, a desire exists in particular in the vehicle industry to make available sound-damping materials that can be applied automatically in controlled fashion with the aid of robots, if possible at the basic-body stage of vehicle manufacture. The hot-curing or vulcanizable elastomer products known from the aforementioned document WO 96/16136 A already largely meet the requirement of applicability at the basic-body stage. A need for improvement exists, however, in terms of easier applicability of the materials. As made known by this document, elastomer products must be capable of application at higher temperatures because of their very high viscosity, and cannot be applied using conventional spray devices.

A need therefore existed for further developing such rubber compounds or rubber compositions so that at room temperature, or optionally at only slightly elevated temperature, they exhibit a sufficiently low viscosity that they can be applied in controlled fashion, using spray application units of the existing art, in those regions of a basic motor vehicle body in which they are most effective in terms of acoustic damping.

BRIEF SUMMARY OF THE INVENTION

The present invention provides sprayable low-viscosity rubber damping compounds based on natural and/or synthetic elastomers having olefinic double bonds, and vulcanization agents, the composition containing a) 5-50 wt% liquid polyene(s) having a weight (mass) average molecular weight below 20,000 b) a vulcanization system selected from the group made up of sulfur and one or more organic accelerator(s) and metal oxide(s), peroxide vulcanization systems, or quinones, quinone dioximes, or dinitrosobenzene, if applicable in combination with organic accelerators and/or metal oxide(s)

c) short fibers having an average fiber length from 50 μm to 500 μm, by preference 100 μm to 250 μm, d) if applicable, further additives selected from the group constituted by thermoplastic polymers in the form of finely comminuted powders, fillers, lightweight fillers, tackifying agents and/or adhesion promoters, extender oils, if applicable plasticizers, aging protection agents, rheology adjuvants, or mixtures thereof, the sum of constituents a) through d) adding up to 100 wt%.

DETAILED DESCRIPTION OF CERTAIN EMBODIMENTS OF THE INVENTION

What is to be understood for purposes of this invention as "acoustically effective damping" or "vibration damping" is solid-borne sound damping, which is known to bring about a diminution in the "drumming" of sheet-metal structures.

The effectiveness of the acoustic damping properties of the compositions according to the present invention is assessed using the flexural vibration test according to part 3 of DIN 53440 ("Oberst method"). For this, steel panels are coated with the compositions according to the present invention, and this coating is then cured under temperature conditions such as those prevailing, for example, in vehicle construction for curing the various paint systems, i.e., in the range between 130° C. and 220° C. The flexural vibration test is then carried out at 200 Hz and different temperatures in order to allow assessment of an effective acoustic damping effect of these compositions in the "utilization temperature range," i.e., between approx. 0° C. and +40° C. All hot-curing (vulcanizable) compositions that exhibit an extremely high damping, i.e. a loss factor d(combi) of the coated panel strip of >0.1, by preference 0.2 or more, in the flexural vibration test per DIN 53440, part 3 are to be considered acoustically effective for purposes of this invention.

"Liquid polyenes" for purposes of this invention are liquid rubbers or elastomers. They can be selected from the following group of the homo- and/or copolymers:

Polybutadienes, in particular the 1,4- and 1,2-polybutadienes, polybutenes, polyisobutylenes, 1,4-polyisoprenes, styrene-butadiene copolymers, butadiene-acrylonitrile copolymers, in which context these polymers can have terminal and/or (statistically distributed) lateral functional groups. Examples of such functional groups are hydroxy, carboxyl, carboxylic acid anhydride, or epoxy groups. The weight (mass) average molecular weight of these liquid rubbers is typically below 20,000, by preference between 900 and 10,000. The proportion of liquid rubber in the entire composition depends on the desired rheology of the uncured composition and the desired mechanical and acoustic damping properties of the cured composition. The proportion of liquid rubber or elastomer normally varies between 5 and 50 wt% of the total formulation. Mixtures of different liquid rubbers or elastomers can also be used.

The addition of finely distributed thermoplastic polymer powders can produce an improvement in acoustic damping when said thermoplastic polymer has a glass transition temperature in the range between 5° C. and 50° C. Examples of suitable thermoplastic polymers are polypropylene, polyethylene, thermoplastic polyurethanes, methacrylate copolymers, styrene copolymers, polyvinyl chloride, polyvinyl acetal, and in particular polyvinyl acetate and copolymers thereof.

The fillers can be selected from a plurality of materials; particularly worthy of mention here are chalks, natural ground or precipitated calcium carbonates, calcium-magnesium carbonates, silicates, barite, and carbon black. Also suitable, in particular, are flake fillers such as, for example, vermiculite, mica, talc, or similar sheet silicates. In certain formulations, flake fillers of this kind have significantly improved the acoustic damping effect. It may be useful, if applicable, for at least a portion of the fillers to be surface-pretreated; coating with stearic acid has proven useful in particular for the various calcium carbonates or chalks.

In addition to the aforesaid "normal" fillers, the compositions according to the present invention can contain so-called lightweight fillers that are selected from the group of the hollow glass spheres, fly ash (finite), hollow plastic spheres based on phenolic resins, epoxy resins, or polyesters, hollow ceramic spheres, or organic lightweight fillers of natural origin such as ground nut shells, for example the shells of cashews or coconuts, or peanut shells, as well as cork flour or coconut powder. Lightweight fillers based on hollow microspheres are particularly preferred; these can be the aforesaid hollow glass spheres or also the expandable or expanded hollow plastic microspheres based on polyvinylidene chloride copolymers or acrylonitrile copolymers; the latter are commercially available under the names "Dualite" or "Expancel" from Henkel Corporation and Akzo Nobel, respectively.

The total proportion of fillers in the formulation can vary between 10 and 70 wt%; the preferred range is between 25 and 60 wt%.

Hydrocarbon resins, phenolic resins, terpene phenolic resins, resorcinol resins or derivatives thereof, modified or unmodified resin acids or esters (abietic acid derivatives), polyamines, polyaminoamides, polyepoxy resins, anhydrides, and copolymers containing anhydride groups can be used as tackifying agents and/or adhesion promoters. The nature and quantity of the tackifying agents and/or adhesion promoters depends on the polymer composition of the adhesive/sealant or coating composition, on the strength of the cured composition, and on the substrate onto which the composition is applied. Typical tackifying resins (tackifiers) such as, for example, the terpene phenolic resins or resin acid derivatives are normally used in concentrations between 5 and 20 wt%; typical adhesion promoters such as polyamines, polyaminoamides, or resorcinol derivatives are used in the range between 0.1 and 10 wt%.

The compositions according to the present invention are by preference free of plasticizers, in particular phthalic acid esters or extender oils. It may, however, be necessary to influence the rheology of the uncured composition and/or the mechanical properties and/or acoustic damping of the cured compositions by the addition of so-called extender oils, i.e., aliphatic, aromatic, or naphthenic oils or citric acid esters. This is preferably done, however, by adding low-molecular-weight polybutenes, polyisobutylenes, or by using low-molecular-weight liquid rubbers. If extender oils are used, quantities in the range between 5 and 20% are utilized.

The suitable hardeners or vulcanization agents, accelerators or catalysts depend on the reactive and/or functional groups of the polymers selected. Suitable for the curing reaction via the olefinic double bonds (vulcanization) of the liquid and/or solid rubbers are radical vulcanization systems, in particular based on organic or inorganic peroxides, vulcanization systems based on sulfur, in particular in combination with organic vulcanization accelerators and, if applicable, zinc compounds; also suitable, however, are vulcanization systems based on quinones, dioximes, or dinitrosobenzene.

Vulcanization systems based on powdered sulfur are particularly preferred, particularly in combination with vulcanization accelerators such as, for example, mercaptobenzothiazole, dithiocarbamates, sulfenamides, disulfides such as, for example, dibenzothiazole disulfide and/or thiuram disulfide, aldehyde amine accelerators, guanidines, and metal oxides such as, for example, zinc oxide. Typical rubber vulcanization adjuvants such as, for example, fatty acids (e.g., stearic acid) can additionally be present in the formulation. The sulfur content can vary within wide limits: it can be up to 5 wt%, by preference up to approximately 10 wt%; the lower limit should by preference not be below 0.5 wt%. The sulfur content depends, in this context, on the reactivity of the liquid rubbers used. The loss factor maximum as well as the usable temperature range of a sufficiently high loss factor can moreover be influenced by way of the sulfur content. The vulcanization accelerator content can vary between 0 and approximately 10 wt%. The metal oxide content is also in the range between 0 and 10 wt%.

Particularly suitable as sulfur-free vulcanization systems are vulcanization systems based on p-benzoquinone dioxime; these compositions can additionally contain the aforesaid vulcanization accelerators and/or metal compounds in the aforesaid quantitative ranges.

Conventional stabilizers such as, for example, sterically hindered phenols or amine derivatives can be used to counteract thermal, thermooxidative, or ozone-related breakdown of the compositions according to the present invention; typical quantitative ranges for these stabilizers are 0.1 to 5 wt%.

Although the rheology of the compositions according to the present invention can normally be brought into the desired range by way of the selection of fillers and the quantitative ratio of the low-molecular-weight liquid rubbers, conventional rheology adjuvants such as, for example, pyrogenic silicic acids or bentone can be used in the range between 0.1 and 7%. Further conventional adjuvants and additives can moreover be utilized in the compositions according to the present invention.

The acoustic damping effectiveness of the composition according to the present invention can be influenced as to the specific needs of the application, in terms of the location of the loss factor maximum and of the temperature range in which extremely high acoustic damping is produced. The principal influencing factors here are the vulcanization system (sulfur content, vulcanization accelerator content), and the concentration and reactivity of the rubbers, in particular liquid rubbers. As already stated, an addition of suitable thermoplastic polymer powders can positively influence both the maximum and the temperature range of the effective acoustic damping.

Controlling the temperature ranges of the acoustic damping factor maximum solely by way of the crosslinking density of the rubber system, as proposed, e.g., in EP 793697 (WO 96/16136), is one way to optimize the acoustic damping effect, but this cannot always be fully implemented because a high crosslinking density of the vulcanized material is usually associated with greater brittleness of the coating. An increase in the specific coating weight without an elevation in crosslinking density also produces an improvement in vibration-damping properties, but the vehicle weight is also thereby increased.

The rubber damping compounds according to the present invention furthermore contain structure-reinforcing fiber fillers based on aramid fibers, carbon fibers, glass fibers, polyamide fibers, polyethylene fibers, or polyester fibers, these fibers by preference being short fibers in the form of pulp fibers or staple fibers. The fibers should, particularly preferably, have an average fiber length of between 100 μm and 250 μm, and a diameter from 5 to 10 μm. The longest fibers should not exceed 1000 μm to 2000 μm. Particularly preferred in this context are glass fibers, polyamide fibers of the aramid fiber type, or also polyester fibers. The composition's fiber content is 0.5 to 10 wt%.

The acoustic properties can also be influenced to a certain extent by selecting the nature and quantity of the other fillers; it has been demonstrated here that flaked fillers in particular, such as, e.g., mica, have an advantageous influence on the loss factor. The loss factor can additionally be influenced by way of the thickness of the coating. Foamed materials are known to produce a higher loss factor, although this is not applicable in cases in which a high tensile shear strength for the adhesive, or a high mechanical load-bearing capacity for the coating, are required. In most applications it is desirable for the loss factor maximum to be located approximately at room temperature (approximately 20° C.), and for the high damping range (loss factor >0.1) to extend over the widest possible temperature range. The curing conditions for the adhesive/sealant or coating compositions according to this invention can be adapted to the specific application. As mentioned initially, one preferred area of application is basic body production in the automotive industry, so that curing of the compositions should take place in a temperature range between 80° C. and 240° C. in 10 to 35 minutes; temperatures between 160 and 200° C. are used by preference in basic body production. A critical advantage of the compositions according to the present invention as compared with plastisols in accordance with the existing art is their so-called "washing resistance" immediately after application of the adhesives, i.e. they do not require pre-gelling (like the plastisols) in order to be resistant to the various basic-body washing and phosphating baths.

As compared with most previously known hot-curable rubber compounds for acoustic damping coatings, the addition of solid rubbers can be completely dispensed with in the context of the compositions according to the present invention. This makes it possible to provide low-viscosity rubber damping compounds that can be applied at room temperature or at slightly elevated temperatures and that can be used in automotive basic body production. Because of their low viscosity, these compositions can be applied using conventional pumping, metering, spraying, or extrusion devices for low-viscosity pasty materials. The particularly preferred areas of utilization are internal coatings of the underbody region. Because of their low viscosity, the rubber damping compounds can be utilized in airless, air-assisted, air-mix, or so-called "swirl spray" methods, or in further common spray methods such as, for example, the "flat stream" method.

The rubber damping compounds according to the present invention have a viscosity from 1000 mPa·s to 100,000 mPa·s at 20° C., measured per DIN 53019. Preferred ranges for the viscosity are

| at 20° C.: | 15,000–80,000 and |
| at 40° C.: | 5,000–20,000 mPa · s |

Because the rubber damping compounds according to the present invention can be manufactured reproducibly in a low-viscosity range and are thus suitable for common spray applications, these compositions can also be applied in particularly controlled fashion at those locations where they produce the greatest damping effectiveness. A method of this kind for ascertaining and specifically applying acoustic damping materials is disclosed, for example, in WO 02/12025.

The compounds according to the present invention having a structure-reinforcing fiber filler content are processable using fully automatic application systems; these also include, in particular, processing through slit nozzles in accordance with the so-called "flat stream" method.

The compositions according to the present invention can be manufactured, in a manner known per se, in mixing machines having a high shearing effect; these include, for example, kneaders, planetary mixers, internal mixers, so-called Banbury mixers, double-screw extruders, and similar mixing machines known to one skilled in the art.

Particularly preferred rubber damping compounds according to the present invention contain the following constituents:

| | |
|---|---|
| 0–10.0% | zinc oxide |
| 0–10.0% | calcium oxide |
| 0–2.0% | 4-methylphenol reaction product with dicyclopentadiene and isobutylene |
| 5.0–30.0% | calcium carbonate coated with stearate |
| 5.0–50.0% | precipitated calcium carbonate |
| 0.5–10.0% | sulfur |
| 0.5–25.0% | graphite |
| 0–2.0% | carbon black |
| 0–2.0% | zinc dibenzyl dithiocarbamate |
| 0–4.0% | MBTS (2,2'-dibenzothiazyl disulfide) |
| 0–10.0% | hollow glass spheres |
| 0.5–10.0% | acetyltri-2-ethylhexyl citrate |
| 0.5–10.0% | glass fibers (average fiber length 100–250 μm, longest fiber 1000–2000 μm) |
| 5.0–40.0% | polybutadiene, MW approx. 1000, approx. 40–50% vinyl |
| 2.0–10.0% | polybutadiene with active carboxyl groups, MW approx. 1700, the sum of all constituents yielding 100%. |

The invention will be further explained in the exemplifying embodiments that follow, the selection of examples being intended to represent no limitation of the scope of the subject matter of the invention.

EXAMPLES

In an evacuatable laboratory kneader, the compositions described below in accordance with Examples 1 and 2 were mixed under vacuum until they were homogeneous. Unless otherwise indicated, all parts in the Examples are parts by weight.

Acoustic Damping Properties

Spring steel strips 1 mm thick and 240 mm×10 mm in size were coated, over a portion 200 mm long, with a layer of the products of Examples 1 and 2; the coatings were then cured for 30 minutes at 180° C. The acoustic damping value (d-combi) was determined in accordance with the flexural vibration test of DIN 53440, part 3, at 200 Hz. The procedure was standardized to a coating weight of 50%, i.e., the weight of the coating having the acoustic damping adhesive/sealant was 50% of the panel weight.

Example 1

| | |
|---|---|
| 2.49% | zinc oxide |
| 4.20% | calcium oxide |
| 0.50% | 4-methylphenol reaction product with dicyclopentadiene and isobutylene |

-continued

| | |
|---|---|
| 15.30% | calcium carbonate coated with stearate |
| 15.41% | precipitated calcium carbonate |
| 3.50% | sulfur |
| 17.50% | graphite |
| 0.50% | carbon black |
| 0.60% | zinc dibenzyl dithiocarbamate |
| 4.00% | hollow glass spheres |
| 4.00% | technical grade white mineral oil |
| 4.00% | glass fibers (average fiber length 100-250 μm and longest fiber 1000-2000 μm) |
| 22.00% | polybutadiene, MW approx. 1000, approx. 40-50% vinyl |
| 6.00% | polybutadiene with active carboxyl groups, MW approx. 1700 |

Example 2

| | |
|---|---|
| 2.49% | zinc oxide |
| 4.20% | calcium oxide |
| 0.50% | 4-methylphenol reaction product with dicyclopentadiene and isobutylene |
| 12.80% | calcium carbonate coated with stearate |
| 19.21% | precipitated calcium carbonate |
| 4.20% | sulfur |
| 15.00% | graphite |
| 0.50% | carbon black |
| 0.60% | zinc dibenzyl dithiocarbamate |
| 0.50% | MBTS (2,2'-dibenzothiazyl sulfide) |
| 4.00% | hollow glass spheres |
| 4.00% | acetyltri-2-ethylhexyl citrate |
| 4.00% | glass fibers (average fiber length 100-250 μm and longest fiber 1000-2000 μm) |
| 22.00% | polybutadiene, MW approx. 1000, approx. 40-50% vinyl |
| 6.00% | polybutadiene with active carboxyl groups, MW approx. 1700 |

Acoustic damping was measured using the flexural vibration test according to DIN 53440, part 3 at 200 Hz, as a function of temperature. The rubber damping compounds according to the present invention exhibit, over the very wide temperature range from approximately 0° C. to approximately 45° C., an acoustic damping value (d-combi) that is well above 0.1 for a coating weight of 50%. This is a definite improvement over the previously known rubber compounds of the existing art, and over other acoustic damping coatings.

What is claimed is:

1. A low-viscosity rubber damping composition that is sprayable through a slit nozzle comprising:
   a) 5.0-40.0% polybutadiene having a molecular weight of about 1000 and comprising about 40-50% vinyl, and, 2.0-10.0% polybutadiene with active carboxyl groups and having a molecular weight of about 1700;
   b) a vulcanization system selected from the group consisting of
      i) sulfur and one or more organic accelerator(s) and metal oxide(s);
      ii) peroxide vulcanization systems; and
      iii) quinones, quinone dioximes, or dinitrosobenzene, optionally in combination with organic accelerators and/or metal oxide(s);
   c) 0.5 to 5 wt% glass fibers having an average fiber length from 50 μm to 500 μm, a diameter of 5-10 microns, and a maximum fiber length of 1000-2000 μm;
   d) optionally, one or more further additives selected from the group consisting of:
      i) thermoplastic polymers in the form of finely comminuted powders;
      ii) fillers;
      iii) lightweight fillers;
      iv) tackifying agents and/or adhesion promoters;
      v) extender oils;
      vi) aging protection agents; and
      vii) rheology adjuvants; and,
   e) 15-25% graphite,
   the sum of constituents a) through e) adding up to 100 wt%, and wherein said composition does not contain solid rubbers and has a viscosity from 1000 mPa·s to 100,000 mPa·s, measured per DIN 53019 at 20° C.

2. The rubber damping composition according to claim 1, additionally comprising at least one thermoplastic polymer having a glass transition temperature between 5° C. and 50° C.

3. The rubber damping composition according to claim 2, wherein the at least one thermoplastic polymer contains olefinic double bonds, hydroxyl groups, carboxyl groups, epoxy groups, amino groups, and/or mercapto groups as functional groups.

4. The rubber damping composition according to claim 1 further comprising polyester fibers, polypropylene fibers, polyamide fibers, carbon fibers, or combinations thereof.

5. The rubber damping composition according to claim 1, wherein said glass fibers have an average fiber length from 100 to 250 μm.

6. A method of manufacturing a rubber damping composition according to claim 1 comprising mixing the constituents under high shear.

7. A method for joining metal parts and/or for sealing a joint between metal parts, comprising
   a) coating at least one surface of at least one of said metal parts with a rubber damping composition according to claim 1;
   b) fitting together said metal parts; and
   c) heating said metal parts that are fitted together to cure said rubber damping composition, optionally while said metal parts are mechanically immobilized.

8. A method for coating a component, said method comprising spraying a rubber damping composition according to claim 1 through a slit nozzle using a flat stream method onto a surface of said component.

9. The method according to claim 6, wherein said rubber damping composition is sprayed onto said surface using a flat stream method through a slit nozzle.

10. A low-viscosity rubber damping composition that is sprayable through a slit nozzle comprising:

| | | |
|---|---|---|
| 2.49-10.0 | wt % | zinc oxide |
| 4.20-10.0 | wt % | calcium oxide |
| 0.50-2.0 | wt % | 4-methylphenol reaction product with dicyclopentadiene and isobutylene |
| 5.0-30.0 | wt % | calcium carbonate coated with stearate |
| 5.0-50.0 | wt % | precipitated calcium carbonate |
| 0.5-10.0 | wt % | sulfur |
| 0.5-25.0 | wt % | graphite |
| 0.50-2.0 | wt % | carbon black |
| 0.60-2.0 | wt % | zinc dibenzyl dithiocarbamate |
| 0.50-4.0 | wt % | MBTS (2,2'-dibenzothiazyl disulfide) |
| 4.00-10.0 | wt % | hollow glass spheres |
| 0.5-10.0 | wt % | acetyltri-2-ethylhexyl citrate |
| 0.5-10.0% | | glass fibers (average fiber length 100-250 μm, longest fiber 1000-2000 μm) |
| 5.0-40.0% | | polybutadiene having a molecular weight of about 1000 and comprising about 40-50% vinyl, and |
| 2.0-10.0% | | polybutadiene with active carboxyl groups and having a molecular weight of about 1700; the sum of all constituents adding up to 100%. |

11. A sprayable low-viscosity rubber damping composition comprising:

| | |
|---|---|
| 2.49 wt % | zinc oxide |
| 4.20 wt % | calcium oxide |
| 0.50 wt % | 4-methylphenol reaction product with dicyclopentadiene and isobutylene |
| 12.80 wt % | calcium carbonate coated with stearate |
| 19.21 wt % | precipitated calcium carbonate |
| 4.20 wt % | sulfur |
| 15.00 wt % | graphite |
| 0.50 wt % | carbon black |
| 0.60 wt % | zinc dibenzyl dithiocarbamate |
| 0.50 wt % | MBTS (2,2'-dibenzothiazyl disulfide) |
| 4.00 wt % | hollow glass spheres |
| 4.00 wt % | acetyltri-2-ethylhexyl citrate |
| 4.00 wt % | glass fibers having an average fiber length of 100-250 μm, and a maximum fiber length of 1000-2000 μm |
| 22.0 wt % | polybutadiene having a molecular weight of about 1000 and comprising about 40-50% vinyl; and, |
| 6.0 wt % | polybutadiene having a molecular weight of about 1700 and comprising active carboxyl groups. |

12. A low-viscosity rubber damping composition that is sprayable through a slit nozzle comprising:

| | |
|---|---|
| 2.49 wt % | zinc oxide |
| 4.20 wt % | calcium oxide |
| 0.50 wt % | 4-methylphenol reaction product with dicyclopentadiene and isobutylene |
| 15.30 wt % | calcium carbonate coated with stearate |
| 15.41 wt % | precipitated calcium carbonate |
| 3.50 wt % | sulfur |
| 17.50 wt % | graphite |
| 0.50 wt % | carbon black |
| 0.60 wt % | zinc dibenzyl dithiocarbamate |
| 0.60 wt % | MBTS (2,2'-dibenzothiazyl disulfide) |
| 4.00 wt % | hollow glass spheres |
| 4.00 wt % | technical grade white mineral oil |
| 4.00 wt % | glass fibers having an average fiber length of 100-250 μm, and a maximum fiber length of 1000-2000 μm |
| 22.0 wt % | polybutadiene having a molecular weight of about 1000 and comprising about 40-50% vinyl; and, |
| 6.0 wt % | polybutadiene having a molecular weight of about 1700 and comprising active carboxyl groups. |

13. The method according to claim 8 further comprising heating the coated component to cure said rubber damping composition.

14. A method of manufacturing a rubber damping composition according to claim 11 comprising mixing the constituents under high shear.

15. A method for joining metal parts and/or for sealing a joint between metal parts, comprising
   a) coating at least one surface of at least one of said metal parts with a rubber damping composition according to claim 11;
   b) fitting together said metal parts; and
   c) heating said metal parts that are fitted together to cure said rubber damping composition, optionally while said metal parts are mechanically immobilized.

16. A method for coating a component, said method comprising spraying a rubber damping composition according to claim 11 through a slit nozzle using a flat stream method onto a surface of said component.

17. The method according to claim 14, wherein said rubber damping composition is sprayed onto said surface using a flat stream method through a slit nozzle.

* * * * *